(12) United States Patent
Misiak et al.

(10) Patent No.: US 8,609,780 B2
(45) Date of Patent: *Dec. 17, 2013

(54) TOUGHENED CYANOACRYLATE COMPOSITIONS

(75) Inventors: Hanns R. Misiak, Haan (DE); William Hally, Naas (IE); Daniel D. Morrogh, Dublin (IE)

(73) Assignee: Henkel Ireland Limited, Monheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,795

(22) Filed: Jun. 29, 2012

(65) Prior Publication Data

US 2012/0322947 A1   Dec. 20, 2012

Related U.S. Application Data

(63) Continuation of application No. 11/538,955, filed on Oct. 5, 2006, now abandoned.

(51) Int. Cl.
*C08F 20/42* (2006.01)

(52) U.S. Cl.
USPC ........... 525/295; 524/357; 524/502; 524/542; 524/556; 524/570; 524/581; 524/592; 526/297

(58) Field of Classification Search
USPC .................... 524/502, 542; 525/295
See application file for complete search history.

(56) References Cited

U.S. PATENT DOCUMENTS

| 4,574,097 | A | * | 3/1986 | Honeycutt | 428/36.1 |
| 5,739,205 | A | * | 4/1998 | Nishino et al. | 524/555 |
| 7,390,851 | B1 | * | 6/2008 | Misiak | 525/193 |
| 7,687,561 | B1 | * | 3/2010 | Misiak | 524/357 |

OTHER PUBLICATIONS

Bauman, B. "Polymer-Polymer Composites Made With Surface-Modified Polymer Particles and Fibers", Inhance/Fluoro-Seal, Ltd, Oct. 2001.*

* cited by examiner

*Primary Examiner* — Nicole M Buie-Hatcher
(74) *Attorney, Agent, or Firm* — Steven C. Bauman

(57) ABSTRACT

The present invention relates to toughened cyanoacrylate compositions.

12 Claims, No Drawings

TOUGHENED CYANOACRYLATE COMPOSITIONS

BACKGROUND OF THE INVENTION

1. Field of the Invention

This invention relates to toughened cyanoacrylate compositions.

2. Brief Description of Related Technology

Cyanoacrylate compositions are well known as one component reactive adhesives, which are quick bonding and suitable for applications on variety of substrates. See H. V. Coover, D. W. Dreifus and J. T. O'Connor, "Cyanoacrylate Adhesives" in *Handbook of Adhesives,* 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology,* S. R. Hartshorn, ed., Plenum Press, New York, p. 249-307 (1986).

U.S. Pat. No. 4,440,910 (O'Connor) pioneered rubber toughened cyanoacrylate compositions through the use of certain organic polymers as toughening additives that are elastomeric, i.e., rubbery, in nature. The '910 patent is thus directed to and claims a curable adhesive comprising a substantially solvent-free mixture of: (a) a cyanoacrylate ester, and (b) about 0.5% to about 20% by weight of an elastomeric polymer. The elastomeric polymer is selected from elastomeric copolymers of a lower alkene monomer and (i) acrylic acid esters, (ii) methacrylic acid esters or (iii) vinyl acetate. More specifically, the '910 patent notes that as toughening additives for cyanoacrylates, acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful.

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

One group of elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer.

Henkel Corporation (as the successor to Loctite Corporation) has sold for a number of years since the filing of the '910 patent rubber toughened cyanoacrylate adhesive products under the tradename BLACK MAX, which employ as the rubber toughening component the DuPont materials called VAMAC B-124 and N123. In addition, Henkel has sold in the past clear and substantially colorless rubber toughened cyanoacrylate adhesive products, namely, LOCTITE 4203, 4204 and 4205, which employ as the rubber toughening component the DuPont material, VAMAC G.

And U.S. Pat. No. 4,105,715 (Gleave) provides a thixotropic, curable cyanoacrylate adhesive composition comprising (a) a monomeric ester of 2-cyanoacrylic acid, (b) to each 100 parts by weight of monomeric ester, about 5 to about 100 parts by weight of a finely divided organic powder selected from (i) polycarbonates, (ii) polyvinylidene fluorides, (iii) polyethylenes, and (iv) acrylic block copolymer resins containing saturated elastomer segments.

Notwithstanding the state of the art, it would be desirable to provide alternative toughened cyanoacrylates for a number of reasons, including providing the end user with additional product choices, hedging against raw material supply interruptions or shortages, or regulatory requirements that hampers widespread usage of certain raw materials.

SUMMARY OF THE INVENTION

The present invention is directed to a toughened cyanoacrylate composition which includes, beyond the cyanoacrylate component, a surface modified polyolefin component, in which in a desirable embodiment the component is constructed of polyethylene in the form of a particle having an average particle size of less than 500μ. The surface modification involves the activation of the outermost surface of the component through exposure to an oxidation process.

Optionally, the present invention may also include a ketone-containing component, such as within the following structures:

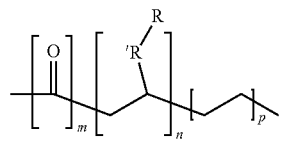

where 'R is

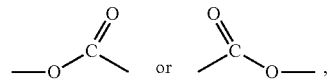

and R is linear or branched $C_1$ to $C_7$ alkyl, $C_2$ to $C_7$ alkenyl, or $C_3$ to $C_7$ cycloalkyl or cycloalkenyl, interrupted or substituted by carbonyl functionality and/or functionalized with a $C_1$ to $C_3$ alkoxy group;

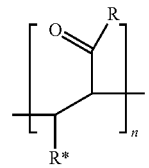

where R is linear or branched $C_1$ to $C_7$ alkyl, $C_2$ to $C_7$ alkenyl, or $C_3$ to $C_7$ cycloalkyl or cycloalkenyl, interrupted or substituted by carbonyl functionality and/or functionalized with a $C_1$ to $C_3$ alkoxy group, and R* is H, methyl, or ethyl. In these structures, as appropriate, m, n and p together equal 100 percent. More specifically, m and n are each between 7 and 15 percent and together are between 17.5 and 26 percent. Of course, p represents that percent value subtracted from 100 percent.

In another aspect, the present invention is directed to a method of bonding two or more substrates including the steps of providing at least two substrates; applying, onto at least a portion of a surface of one or both of the at least two substrates, a cyanoacrylate composition as noted above; contacting the surfaces of the at least two substrates having the cyanoacrylate composition therebetween; and curing the cyanoacrylate composition.

In still another aspect, the present invention is directed to a bonded assembly including: a first substrate having a first surface; another substrate having a second surface; and a cured cyanoacrylate composition disposed between the first and second surfaces, the composition having included prior to cure: a cyanoacrylate component and the polymer component as noted above.

In yet another aspect, the present invention is directed to a method of preparing the cyanoacrylate composition as noted above.

DETAILED DESCRIPTION OF THE INVENTION

The present invention is directed to a toughened cyanoacrylate composition which includes, beyond the cyanoacrylate component, a surface modified polyolefin component, in which in a desirable embodiment the component is constructed of polyethylene in the form of a particle having an average particle size of less than 500 μm. The surface modification involves the activation of the surface of the component through exposure to an oxidation process.

The cyanoacrylate component includes at least one α-cyanoacrylate monomer of the formula:

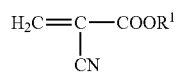

where $R^1$ represents a straight chain or branched chain alkyl group having 1 to 12 carbon atoms (which may be substituted with a substituent such as a halogen atom or an alkoxy group), a straight chain or branched chain alkenyl group having 2 to 12 carbon atoms, a straight chain or branched chain alkynyl group having 2 to 12 carbon atoms, a cycloalkyl group, an aralkyl group or any aryl group. Specific examples of $R^1$ are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-chloroethyl group, a 3-chloropropyl group, a 2-chlorobutyl group, a trifluoroethyl group, a 2-methoxyethyl group, a 3-methoxybutyl group and a 2-ethoxyethyl group. Ethyl cyanoacrylate is a particularly desirable choice for use in the inventive compositions.

A single α-cyanoacrylate monomer or a mixture of two or more of these α-cyanoacrylate monomers can be used. Generally, the above α-cyanoacrylate monomer used alone as an adhesive, and one or more components such as those set forth below, are used to formulate a commercial composition. The additional components includes, but are not limited to, accelerators; anionic polymerization inhibitors; radical polymerization inhibitors; additives, such as plasticizers, heat stabilizers and toughening agents; and/or perfumes, dyes, and pigments.

A suitable amount of α-cyanoacrylate monomer present in the inventive compositions is from about 50 to 99.5% by weight, such as 60 to 95% by weight, desirable 85% by weight, based on the total weight of the composition.

The surface modified component may take many forms. For instance, Inhance/Fluoro-Seal, Ltd.s' surface-modification technology is a controlled oxidation process in which a reactive gas atmosphere modifies the outermost molecular layer of a particle/fiber/plastic/film or fabric. The treatment causes the molecular backbone and/or side chains to react, resulting in formation of polar functional groups on the surface, such as hydroxyls and carboxylates.

According to Inhance's website, these oxygen-containing chemical functionalities cause the treated particles to have high surface energy. This in turn means that the treated particles are readily wetted and dispersed in polar polymers, such as polyols. The surface modification also results in stronger bonding between the particles (or fibers) and the matrix resin. The enhanced adhesion is a result of chemical bonding with surface functionalities and hydrogen. See www.inhanceproducts.com/technology.html, Aug. 10, 2006.

Commercially available surface modified polyolefins from Inhance include those in the family described as INHANCE® UH-1000 and HD-1000 series particles. Specific representatives of that family include those designated as UH-1045 (having an average size of 300 μm), UH-1080 (having an average size of 125 μm), UH-1200 (having an average size of 63 μm), UH-1250 (having an average size of 53 μm), UH-1500 (having an average size of 45 μm), UH-1700 (having an average size of 38 μm) and HD-1800 (having an average size of 18 μm).

INHANCE® UH-1000 series particles are free flowing white particles or powder, derived from virgin UHMWPE resin, and having the following general properties:
Surface Energy: 55+ dynes/cm (water wettable)
Specific Gravity: 0.93-0.94
Bulk Density: 20-31 lb./ft³ (0.32-0.50 g/cc)
Molecular Weight: 3,000,000-5,000,000

INHANCE® UH-1000 Series Particles are reported to provide composites with superior abrasion resistance, reduced coefficient of friction, enhanced work of fracture and improved moisture barrier.

The optional ketone-containing material may be within the following structures:

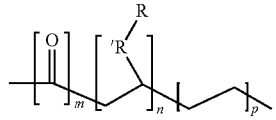

where 'R is

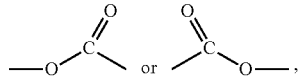

and R is linear or branched $C_1$ to $C_7$ alkyl, $C_2$ to $C_7$ alkenyl, or $C_3$ to $C_7$ cycloalkyl or cycloalkenyl, interrupted or substituted by carbonyl functionality and/or functionalized with a $C_1$ to $C_3$ alkoxy group;

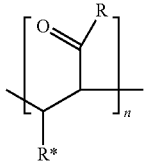

$C_3$ to $C_7$ cycloalkyl or cycloalkenyl, interrupted or substituted by carbonyl functionality and/or functionalized with a $C_1$ to $C_3$ alkoxy group, and R* is H, methyl, or ethyl. In these structures, as appropriate, m, n and p are each between 7 and 15 percent and together are between 17.5 and 26 percent. Of course, p represents that percent value substracted from 100 percent.

Particularly desirable ketone-containing materials according to these structures include those prepared from terpolymers of carbon monoxide, unsaturated ester (e.g., a vinylester or an ester of an unsaturated acid) and ethylene, for instance poly(ethylene-co-vinylacetate-co-carbon monoxide) ("PE-VACO"), such as is available commercially from Aldrich or Du Pont under the tradenames ELVALOY 741, ELVALOY 742 and ELVALOY 4924; and poly(ethylene-co-butylacrylate-co-carbon monoxide) (also known as a butylacrylate/ethylene/carbon monoxide co-polymer, "BAECO"), such as is available commercially from Aldrich or Du Pont under the tradenames ELVALOY HP661, ELVALOY HP662 and ELVALOY HP771; and homopolymers of a vinylketone, such as poly(methylvinylketone) ("PMVK").

The ketone-containing material should be used in the present invention in amounts of about 0.5% to about 30%, for instance about 2.5% to about 20%, such as about 5% to about 15%, by weight based on the total weight of the composition where R is linear or branched $C_1$ to $C_7$ alkyl, $C_2$ to $C_7$ alkenyl, or An anionic polymerization inhibitor is generally added to α-cyanoacrylate compositions in an amount from about 0.0001 to 10% by weight based on the total weight of the composition, to increase the stability of the composition during storage. Examples of useful inhibitors include sulfur dioxide, sulfur trioxide, nitric oxide, hydrogen fluoride, organic sultone inhibitors, boron trifluoride and methane sulfonic acid, aromatic sulfonic acids, aliphatic sulfonic acids, and sulfones. The amount of inhibitor will suitably be any convenient amount in order to slow down cure of the composition. Desirably, inhibitors of anionic polymerization are present at about 0.0001% to about 0.1% by weight based on the total weight of the composition.

A radical polymerization inhibitor is generally added to α-cyanoacrylate compositions as well, in an amount from about 0.001 to 2.0%, particularly 0.03 to 0.5%, based on the total weight of the composition, for the purpose of capturing radicals which are formed by light during storage. Such inhibitors are ordinarily of the phenolic type include, for example, hydroquinone and hydroquinone monomethyl ether. Other inhibitors suitable for use herein include butylated hydroxytoluene and butylated hydroxyanisole.

A thickener may be added to increase the viscosity of the α-cyanoacrylate composition. Various polymers can be used as thickeners, and examples include poly(methyl methacrylate) ("PMMA"), poly(ethyl methacrylate) ("PEMA"), methacrylate-type copolymers, acrylic rubbers, cellulose derivatives, polyvinyl acetate and poly(α-cyanoacrylate). A suitable amount of thickener is generally about 0.01 to 30% by weight, preferably 5.0 to 25% by weight, based on the total weight of the cyanoacrylate composition.

Plasticizers may also be added to the cyanoacrylate component to further aid in durability and impact, heat, and moisture resistance. The plasticizer is preferably present in an amount of about 0.005% to about 5.0%, more preferably about 0.01% to about 2.0% by weight based on the total weight of the composition.

Perfumes, dyes, pigments, and the like may be added to the inventive composition depending on use purposes in amounts which do not adversely affect the stability of the α-cyanoacrylate monomer. The use of such additives is within the skill of those practicing in the cyanoacrylate adhesive art and need not be detailed herein.

Accelerators that may be useful in the cyanoacrylate compositions include for example calixarenes, oxacalixarenes, and combinations thereof. Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

Another potentially useful accelerator component is a crown ether. A host of crown ethers are known. For instance, examples which may be used herein either individually or in combination, or in combination with the calixarenes and oxacalixarenes described above include 15-crown-5, 18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4,1,2-decalyl-15-crown-5,1,2-naphtho-15-crown-5, 3,4,5-naphthyl-16-crown-5, 1,2-methyl-benzo-18-crown-6, 1,2-methylbenzo-5,6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Other suitable accelerators include those described in U.S. Pat. No. 5,312,864 (Wenz), which are hydroxyl group derivatives of an α-, β- or γ-cyclodextrin which is at least partly soluble in the cyanoacrylate; in U.S. Pat. No. 4,906,317 (Liu), which are silacrown compounds to accelerate fixturing and cure on de-activating substrates such as wood, examples of which are within the following structure:

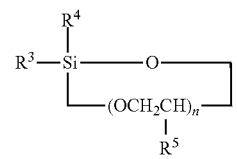

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups such as methoxy, and aryloxy groups such as phenoxy. The $R^3$ and $R^4$ groups may contain halogen or other substituents, an example being trifluoropropyl. However, groups not suitable as $R^4$ and $R^5$ groups are basic groups such as amino, substituted amino and alkylamino.

Specific examples of silacrown compounds useful in the inventive compositions include:

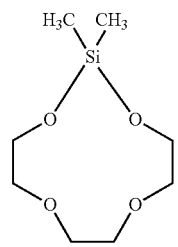

dimethylsila-11-crown-4;

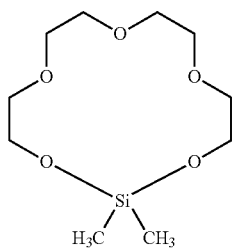 [SMILES: C[Si]1(C)OCCOCCOCCOCCO1]

dimethylsila-14-crown-5; and

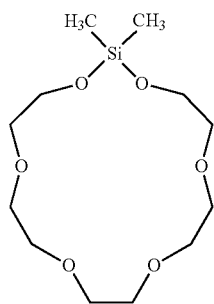 [SMILES: C[Si]1(C)OCCOCCOCCOCCOCCO1]

dimethylsila-17-crown-6.

The accelerator component should be included in the compositions in an amount within the range of from about 0.1% to about 10%, with the range of about 0.5% to about 5% being desirable, and about 0.1% to about 1% by weight based on the total weight of the composition being particularly desirable. See e.g. U.S. Pat. Nos. 4,170,585; 4,450,265; 6,294,629; and 6,475,331, the contents of which are all incorporated herein by reference.

It may also be desirable to co-toughen the inventive composition with a secondary co-toughening component, such as those disclosed in U.S. Pat. No. 4,440,910 (O'Connor), which pioneered rubber toughened cyanoacrylate compositions through the use of certain organic polymers as toughening additives that are elastomeric, i.e., rubbery, in nature. The '910 patent is thus directed to and claims a curable adhesive comprising a substantially solvent-free mixture of: (a) a cyanoacrylate ester, and (b) about 0.5% to about 20% by weight of an elastomeric polymer. The elastomeric polymer is selected from elastomeric copolymers of a lower alkene monomer and (i) acrylic acid esters, (ii) methacrylic acid esters or (iii) vinyl acetate. More specifically, the '910 patent notes that as toughening additives for cyanoacrylates, acrylic rubbers; polyester urethanes; ethylene-vinyl acetates; fluorinated rubbers; isoprene-acrylonitrile polymers; chlorosulfonated polyethylenes; and homopolymers of polyvinyl acetate were found to be particularly useful.

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

One group of elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer.

Henkel Corporation (as the successor to Loctite Corporation) has sold for a number of years since the filing of the '910 patent rubber toughened cyanoacrylate adhesive products under the tradename BLACK MAX, which employ as the rubber toughening component the DuPont materials called VAMAC B-124 and N123. Thus, these DuPont materials may be used to co-toughen the inventive composition. In addition, Henkel has sold in the past clear and substantially colorless rubber toughened cyanoacrylate adhesive products, namely, LOCTITE 4203, 4204 and 4205, which employ as the rubber toughening component the DuPont material, VAMAC G. VAMAC G may be used to co-toughen the inventive composition, as well.

VAMAC VCS rubber appears to be the base rubber, from which the remaining members of the VAMAC product line are compounded. VAMAC VCS is a reaction product of the combination of ethylene, methyl acrylate and monomers having carboxylic acid cure sites, which once formed is then substantially free of processing aids such as the release agents octadecyl amine, complex organic phosphate esters and/or stearic acid, and anti-oxidants, such as substituted diphenyl amine.

Recently, DuPont has provided to the market under the trade designation VAMAC VMX 1012 and VCD 6200, which are rubbers made from ethylene and methyl acrylate. It is believed that the VAMAC VMX 1012 rubber possesses little to no carboxylic acid in the polymer backbone. Like the VAMAC VCS rubber, the VAMAC VMX 1012 and VCD 6200 rubbers are substantially free of processing aids such as the release agents octadecyl amine, complex organic phosphate esters and/or stearic acid, and anti-oxidants, such as substituted diphenyl amine, noted above.

The inventive composition may be co-toughened with a rubber toughening component having (a) reaction products of the combination of ethylene, methyl acrylate and monomers having carboxylic acid cure sites, (b) dipolymers of ethylene and methyl acrylate, and combinations of (a) and (b), which once the reaction products and/or dipolymers are formed are then substantially free of processing aids, such as the release agents octadecyl amine (reported by DuPont to be available commercially from Akzo Nobel under the tradename ARMEEN 18D), complex organic phosphate esters (reported by DuPont to be available commercially from R.T. Vanderbilt Co., Inc. under the tradename VANFRE VAM), stearic acid and/or polyethylene glycol ether wax, and anti-oxidants, such as substituted diphenyl amine (reported by DuPont to be available commercially from Uniroyal Chemical under the tradename NAUGARD 445). Commercial examples of such rubber tougheners include VAMAC VMX 1012 and VCD 6200 rubbers, and these may be used too.

Preparation of the Compositions and Products of the present invention can be achieved by mixing the polyketone material into the cyanoacrylate composition at room temperature. Mixing is performed for a time sufficient to disperse or dissolve the polyketone material into the cyanoacrylate composition, which can vary depending on the batch size. Generally, only seconds or minutes are required to achieve the desired blending in of the polymer material.

The cyanoacrylate compositions of the present invention are useful in bonding two or more substrates. A sufficient portion of the composition may be placed on a surface of one of the two or more substrates. The other substrate is then positioned adjacent to the cyanoacrylate composition and the two substrates are placed in contact to form an assembly, upon curing of the cyanoacrylate.

The following non-limiting examples are intended to further illustrate the present invention.

EXAMPLES

Referring to Tables 1A and 1B, cyanoacrylate compositions labeled Sample Nos. 1-18 were prepared by incorporating into the specified cyanoacrylate the respective amounts indicated of toughening agent and where noted thickener, with mixing for a period of time of about 0.5 to 1 hour at a temperature of about 50-85° C. The samples were also stabilized at the parts per million level with acid stabilizers and free radical stabilizers.

Below in Tables 2A and 2B are data for T peel strength captured for the samples set forth in Tables 1A and 1B.

TABLE 2A

| Physical Properties | | Sample No | | | | | | | | | |
|---|---|---|---|---|---|---|---|---|---|---|---|
| | | 1 | 2 | 3 | 4 | 5 | 6 | 7 | 8 | 9 | 10 |
| T Peel Strength ($N/mm^2$) | Steel [mild] | 0.4 | 2.0 | 2.1 | 3.0 | 3.3 | 1.9 | 2.0 | 2.6 | 2.8 | 0.8 |

TABLE 2B

| Physical Properties | | Sample No | | | | | |
|---|---|---|---|---|---|---|---|
| | | 11 | 12 | 13 | 14 | 15 | 16 |
| T Peel Strength ($N/mm^2$) | Steel [mild] | 2.3 | 2.3 | 2.5 | 2.9 | 0.4 | 1.2 |

In Tables 2A and 2B, T peel strength on mild steel for cyanoacrylate compositions prepared with several different tougheners are reported. The mild steel substrates were prepared by wiping with acetone prior to use.

The results set forth in Tables 2A and 2B indicate that T peel strength improved through the addition of surface modification polyethylene.

Referring to Table 3, cyanoacrylate compositions labeled Sample Nos. 17-24 were prepared by incorporating into the specified cyanoacrylate the respective amounts indicated of toughening agent, where noted thickener, and curing accelerator with mixing for a period of time of about 0.5 to 1 hour at a temperature of about 50-85° C. The samples were also stabilized at the parts per million level with acid stabilizers and free radical stabilizers.

TABLE 1A

| Components | | Sample No./Amt. (wt. %) | | | | | | | |
|---|---|---|---|---|---|---|---|---|---|
| Type | Identity | 1 | 2 | 3 | 4 | 5 | 6 | 7 | 8 |
| CA | EtCA | Bal. | Bal. | Bal. | Bal. | Bal. | Bal. | Bal. | Bal. |
| Toughening Agent | UH-1250 | — | 0.8 | 2 | 5 | 12 | 30 | — | — |
| | UH-1800 | — | — | — | — | — | — | 12 | — |
| | UH-1700 | — | — | — | — | — | — | — | 12 |

TABLE 1B

| Components | | Sample No./Amt. (wt. %) | | | | | | | |
|---|---|---|---|---|---|---|---|---|---|
| Type | Identity | 9 | 10 | 11 | 12 | 13 | 14 | 15 | 16 |
| CA | EtCA | Bal. | Bal. | Bal. | Bal. | Bal. | Bal. | — | — |
| | MeOEtCA | — | — | — | — | — | — | Bal. | Bal. |
| Toughening Agent | UH-1250 | — | — | 5 | 10 | 15 | 20 | — | 15 |
| | UH-1500 | 12 | — | — | — | — | — | — | — |
| Thickener | PMMA | — | 6 | 6 | 6 | 6 | 6 | — | — |

|  |  | Sample No. (wt. %) | | | | | | | |
| --- | --- | --- | --- | --- | --- | --- | --- | --- | --- |
| Physical Properties |  | 17 | 18 | 19 | 20 | 21 | 22 | 23 | 24 |
| CA | EtCA | Bal. | Bal. | Bal. | Bal. | Bal. | Bal. | — | — |
|  | MeOEtCA | — | — | — | — | — | — | Bal. | Bal. |
| Toughening Agent | PEVACO | 6.5 | 6.5 | 6.5 | 6.5 | — | — | — | — |
|  | VAMAC VCS 5500 | 2.0 | 2.0 | 2.0 | 2.0 | 2.0 | 2.0 | 2.0 | 2.0 |
|  | ELVALOY HP742 | — | — | — | — | 6.25 | 6.25 | 8.0 | 8.0 |
|  | UH-1250 | — | 0.2 | 0.4 | 1.6 | — | 0.425 | — | 0.42 |
| Thickener | PMMA | — | — | — | — | — | — | 6.0 | 6.0 |
| Curing Accelerator | Crown Ether | 0.1 | 0.1 | 0.1 | 0.1 | 0.12 | 0.12 | 0.12 | 0.12 |

Below in Table 4 is data for T peel strength captured for the samples set forth in Table 3.

TABLE 4

|  |  | Sample No. | | | | | | | |
| --- | --- | --- | --- | --- | --- | --- | --- | --- | --- |
| Physical properties |  | 17 | 18 | 19 | 20 | 21 | 22 | 23 | 24 |
| T Peel Strength (N/mm²) | Aluminum | 1.0 | 2.2 | 3.7 | 4.2 | 3.0 | 4.0 | — | — |
|  | Steel [mild] | 1.5 | 1.9 | 2.3 | 2.4 | 2.6 | 5.0 | 2.6 | 5.1 |

In Table 4, T peel strength on aluminum and mild steel for cyanoacrylate compositions prepared with several different tougheners are reported. The aluminum and mild steel substrates were prepared by wiping with acetone prior to use.

The results set forth in Table 4 indicate that T peel strength improved through the addition of surface modification polyethylene.

Referring now to Tables 5 and 6, certain commercially available cyanoacrylate compositions were evaluated with and without the addition of certain surface modified polyolefins. The components of the samples are set forth in Table 5; the results of the evaluations are set forth in Table 6.

| Type | Identity | 25 | 26 | 27 | 28 | 29 | 30 |
| --- | --- | --- | --- | --- | --- | --- | --- |
| CA | LOCTITE 435 | Bal. | Bal. | | | | |
|  | LOCTITE 438 | | | Bal. | Bal. | | |
|  | LOCTITE 480 | | | | | Bal. | Bal. |
| Toughening Agent | UH-1250 | — | 0.425 | — | 0.425 | — | 0.425 |

TABLE 6

| Sample No. | Tensile shear (N/mm²) (st. dev. In parenthesis) | Side impact (Joules) | Fixture time (secs) |
| --- | --- | --- | --- |
| 25 | 15.34(1.21) | 7.2 | 20 |
| 26 | 19.37(1.18) | 10 | 20 |
| 27 | 15.28(1.44) | 6.6 | 20 |
| 28 | 19.09(2.44) | 8.8 | 25 |
| 29 | 13.70(0.54) | 5.6 | — |
| 30 | 15.89(0.65) | 7 | — |

Tensile shear strength is the force required to break the adhesive bond formed after a 24 hour room temperature cure between two lapshears of a given substrate (here, aluminum). The side impact is measured between a pair of bonded lapshears of a given substrate (here, aluminum), which are then subjected to a side impact from a pendulum. The energy required to break the adhesive bond is measured, and is referred to as the side impact strength. The fixture time is the time required for a 5 mg drop of adhesive to bond two lapshears (of a given substrate, here aluminum) together so that they can support a 3 kg weight.

The addition UH 1250 to cyanoacrylate adhesives showed a positive effect on the adhesive properties to certain substrates, especially aluminum, without having a large negative impact on the cure speed or fixture times. This positive effect can be observed in the increase in tensile shear strength and resistance to side impacts (using a pendulum). The UH 1250 were added at 0.425% to various LOCTITE adhesive grades, and this addition corresponds to a 26% increase to the tensile shear strength of aluminum lapshears bonded using the modified LOCTITE 435 grade. An increase in tensile shear strength was also achieved when the UH 1250 were added to other Loctite grades, namely 438 and 480.

What is claimed is:

1. A cyanoacrylate composition comprising:

at least one α-cyanoacrylate compound; and a polyolefin having an average particle size of 500 or less, whose surface has been modified through oxidation of the outermost surface thereof; and a ketone-containing material within the following structure

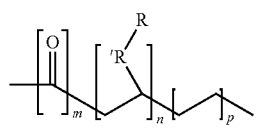

wherein 'R is

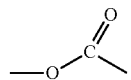

or

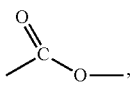

R is linear or branched $C_1$ to $C_7$ alkyl, $C_2$ to $C_7$ alkenyl, or $C_3$ to $C_7$ cycloalkyl or cycloalkenyl, interrupted or substituted by carbonyl functionality and/or functionalized with a $C_1$ to $C_3$ alkoxy group; and the sum of m, n and p is 100 percent, or a polyketone material within the following structure:

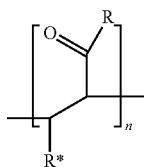

wherein R is linear or branched $C_1$ to $C_7$ alkyl, $C_2$ to $C_7$ alkenyl, or $C_3$ to $C_7$ cycloalkyl or cycloalkenyl, interrupted or substituted by carbonyl functionality and/or functionalized with a $C_1$ to $C_3$ alkoxy group; and R* is H, methyl, or ethyl; and n is 100 percent.

2. The composition of claim 1, wherein said ketone-containing material is a member selected from the group consisting of terpolymers of carbon monoxide, unsaturated ester and ethylene; poly(ethylene-co-butylacrylate-co-carbon monoxide); and homopolymers of a vinylketone.

3. The composition of claim 1, wherein said ketone-containing material is poly(ethylene-co-vinylacetate-co-carbon monoxide).

4. The composition of claim 1, wherein said ketone-containing material is present in an amount sufficient to toughen said composition once cured.

5. The composition of claim 1, wherein the α-cyanoacrylate is represented by compounds of the formula:

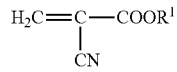

wherein $R^1$ represents a straight chain or branched chain substituted or unsubstituted alkyl group having 1 to 12 carbon atoms, a straight chain or branched chain substituted or unsubstituted alkenyl group having 2 to 12 carbon atoms, a straight chain or branched chain substituted or unsubstituted alkynyl group having 2 to 12 carbon atoms, a substituted or unsubstituted cycloalkyl group, an substituted or unsubstituted aralkyl group or a substituted or unsubstituted aryl group.

6. The composition of claim 5, wherein $R^1$ is selected from the group consisting of a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-chloroethyl group, a 3-chloropropyl group, a 2-chlorobutyl group, a trifluoroethyl group, a 2-methoxyethyl group, a 3-methoxybutyl group, a 2-ethoxyethyl group and combinations thereof.

7. The composition of claim 1, wherein said α-cyanoacrylate is an ethyl cyanoacrylate monomer.

8. The composition of claim 1, further comprising a thickener.

9. The composition of claim 1, wherein said ketone-containing material is present in amounts of about 0.5% to about 30% by weight of the composition.

10. The composition of claim 1, wherein said α-cyanoacrylate compound comprises an ethyl cyanoacrylate monomer and said polyketone material comprises poly(ethylene-co-vinylacetate-co-carbon monoxide).

11. The composition of claim 1, further comprising a co-toughener.

12. The composition of claim 11, wherein the co-toughener is a member selected from the group consisting of acrylic rubbers; polyester urethanes; ethylene-vinyl acetates; fluorinated rubbers; isoprene-acrylonitrile polymers; chlorosulfonated polyethylenes; homopolymers of polyvinyl acetate; and reaction products of the combination of ethylene, methyl acrylate and monomers having carboxylic acid cure sites, which once formed are then substantially free of processing aids and anti-oxidants; and combinations thereof.

* * * * *